United States Patent [19]
Milkner et al.

[11] Patent Number: 6,078,852
[45] Date of Patent: Jun. 20, 2000

[54] METHOD AND DEVICE FOR ADMINISTERING WAKE TIMES

[75] Inventors: Ralf Milkner, Weil der Stadt; Alfred Kloos, Weissach, both of Germany

[73] Assignee: Robert Bosch GmbH, Stuttgart, Germany

[21] Appl. No.: 08/993,582

[22] Filed: Dec. 18, 1997

[30]     Foreign Application Priority Data

Dec. 18, 1996 [DE] Germany ................ 196 52 617

[51] Int. Cl.$^7$ .............................. H01H 9/54; G06F 13/14
[52] U.S. Cl. .............................. 701/36; 702/188
[58] Field of Search .................. 701/36, 1, 29, 701/35; 713/600; 307/139; 702/187, 188, 123, 125, 176, 178

[56]         References Cited

U.S. PATENT DOCUMENTS

| | | | |
|---|---|---|---|
| 4,301,515 | 11/1981 | Fahey et al. ...................... | 364/900 |
| 4,418,333 | 11/1983 | Schwarzbach et al. ............ | 340/310 A |
| 4,853,847 | 8/1989 | Ohuchi .............................. | 364/200 |
| 5,345,564 | 9/1994 | Jensen et al. ..................... | 395/275 |
| 5,521,445 | 5/1996 | Letorey et al. .................... | 307/139 |
| 5,577,235 | 11/1996 | Mitra ................................ | 395/559 |
| 5,579,513 | 11/1996 | Strohmer .......................... | 395/559 |
| 5,774,377 | 6/1998 | Eidson et al. ..................... | 364/550 |
| 5,835,736 | 11/1998 | Maeda et al. ..................... | 395/290 |

*Primary Examiner*—Tan Nguyen
*Attorney, Agent, or Firm*—Michael J. Striker

[57]         ABSTRACT

Administering of wake times in an interconnected assembly of several control devices and a time base control device is performed by transmitting by each control device a timely next wake time to the time base control device, comparing the transmitted wake times with one another, storing a timely next wake time by the time base control device, and upon reaching the stored wake time, transmitting by the time control device an actual time to the control devices.

10 Claims, 3 Drawing Sheets

METHOD AND DEVICE FOR ADMINISTERING WAKE TIMES

BACKGROUND OF THE INVENTION

The present invention relates to a method of administering wake times in an interconnected assembly of several control devices and a time base control device. The present invention also relates to an interconnected assembly of several control devices and a time base control device for a motor vehicle, wherein each control device and the time base control device include a memory unit for receiving wake times.

Control devices are utilized in an increasing degree in modern motor vehicles and are interconnected with one another for example through a so-called CAN bus. The control devices operate for performing different functions, for example for controlling the stage heating. Many of the utilized control devices, for example also the stage heating control device, require a time base which supplies the time and when necessary the date to perform corresponding time-dependent tasks. Each control device is joined through its own time base, and a synchronization of all time bases is performed in a network. Because of the complexity and hardware expense for the plurality of time bases available in a network, it has been further proposed to operate a time base centrally in the network. This central time base has the advantage that the control-relevant time data, hereinafter referred to wake times, are administered, and the actual time for all control devices in the net are made ready.

Thus, from the prior art it is for example known to administer all wake times of all control devices available in the net from a time base control device (hereinbelow identified as time control device). For example the stage heating control device which participates in turning on and turning off of the time control device, after reaching a predetermined time point sends a message to the stage heating control device and induces it for releasing the corresponding action. During a selection of control devices in a network, this procedure leads however to a substantial expense for administering and storing the wake times.

An improvement of the procedure is achieved when the time device administers only the actual wake time of each control device. Here each control device must transmit only the next wake time to the time control device. Upon reaching the wake time, the control device is "awaken", to perform its action and to communicate to the time control device the next wake time (as long as it is available). As a result the time control device for each control device to be awakened must be supplied only with one time. The disadvantage of this solution however is that the time control device for each control device available in the network must administer a memory place, so that with each new incoming control device the memory requirement increases and the memory administering expenses correspondingly increase.

SUMMARY OF THE INVENTION

Accordingly, it is an object of the present invention to provide a method and a device for administering wake times, which avoid the disadvantages of the prior art.

In keeping with these objects and with others which will become apparent hereinafter, one feature of present invention resides, briefly stated, in a method for administering wake times in an interconnected assembly of several control devices and a time base control device, in which each control device transmits a timely next wake time to the basis control device, the transmitted wake times are compared with one another and the timely next wake time is stored by the time base control device, and the time base control device upon reaching the stored wake time transmits an actual time to the control devices.

In accordance with another feature of the present invention, an interconnected assembly of several control devices and a time base control device for a motor vehicle is provided, in which each control device and the time base control device include a memory unit for receiving wake times, wherein in accordance with the present invention the memory unit for the time base control device is provided for receiving a wake time data, and the time base control device includes a comparing and evaluating unit which compares the wake times transmitted from the control devices, selects the timely next wake time, and supplies the same to the memory unit.

When the method is performed and the device is designed in accordance with the present invention, the expenses for administering and storing the wake times can be reduced to a minimum, and therefore a cost-favorable and modular realization is possible.

Since the time control device stores only one wake time and the remaining wake times are stored decentralized in the control devices, the administration expense is minimal.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
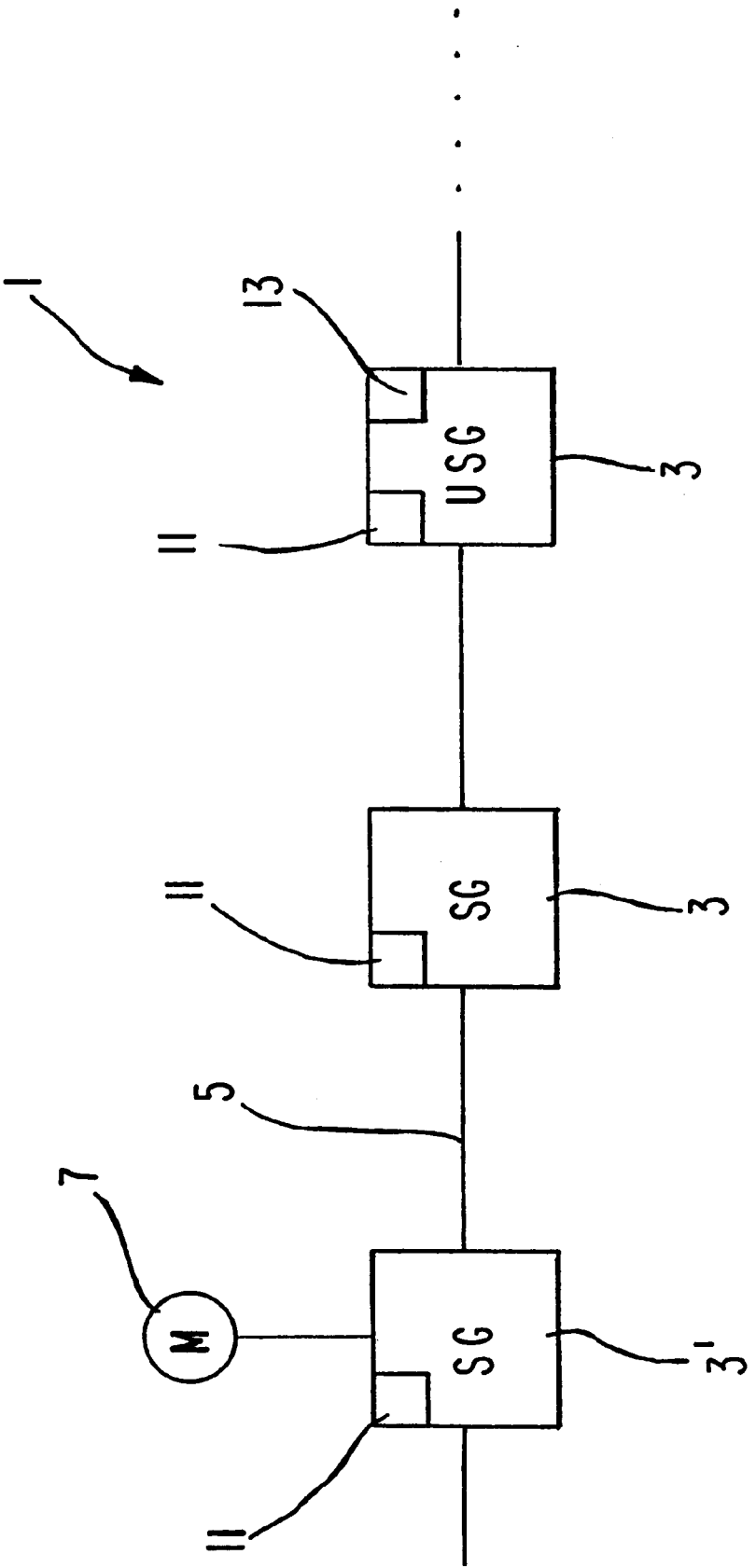
FIG. 1 is a view schematically showing an interconnected assembly of the devices in accordance with the present invention.

FIG. 1 schematically shows an assembly 1 which is composed of a plurality of control devices 3. Such an assembly 1 of the control devices 3 can be used for example in a motor vehicle. The control devices 3 are connected with one another through a so-called CAN bus, so that a communication between the individual control devices 3 is possible.

The control devices 3 perform several functions inside the motor vehicle, for example controlling a stage heating. For example, FIG. 1 shows an adjusting motor 7 which is controlled by the control device 3' and actuates one or several ventilation flaps of the heating for the operation of the stage heating.

The assembly shown in FIG. 1 also has a time control device 9 which is connected also to the CAN bus 5. This time control device 9 differs from the above mentioned control devices 3 by the fact that it has a time base. The time base supplies, in addition to the actual time, also the data, as for example required for the time-controlled stage heating of the vehicle.

For example, a modern stage heating system can provide the input for different turning on and turning off time with the corresponding datum report. These data are first stored in the control device 3' in a memory unit 11. The memory unit 11 which is shown schematically is provided in each control device 3 and also in the time control device 9. In addition, the time control device also has a schematically shown comparing and evaluating device 13 which from a plurality of time data (wake times), selects the wake time which is the closest to the actual time.

Figure 2A:
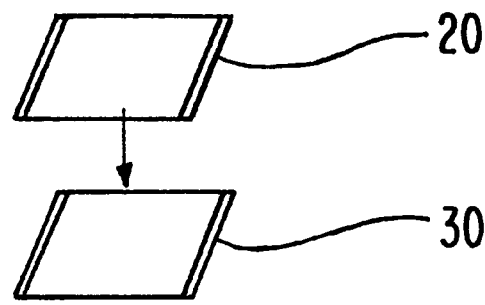
FIGS. 2A, 2B, 2C are views showing a flow chart for illustration of the individual method steps in a time control device of the present invention.
Figure 2B:
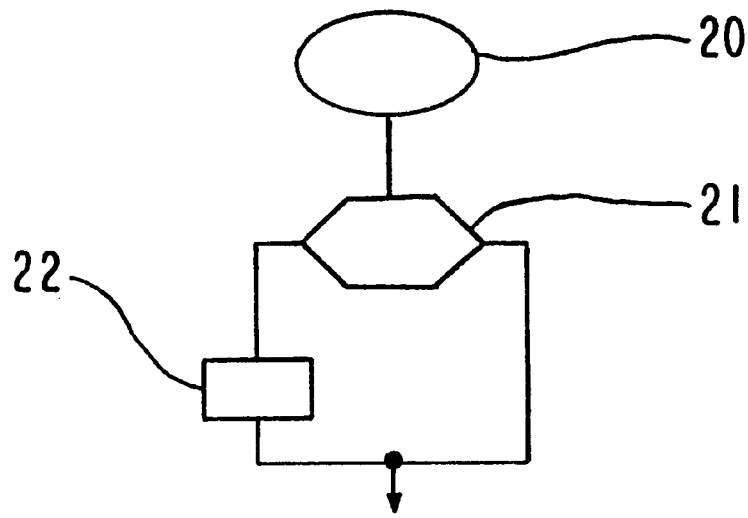
Figure 2C:
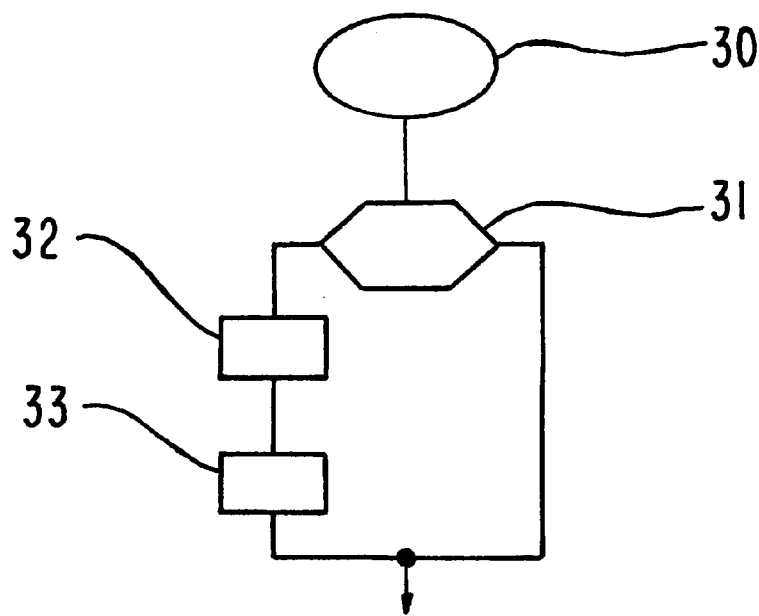
Figure 3A:
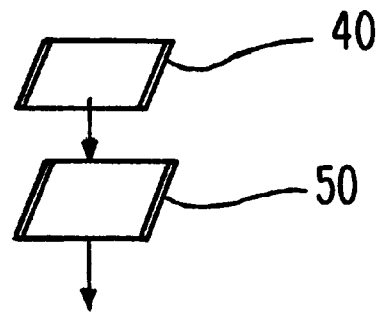
FIGS. 3A, 3B, 3C are flow charts for illustration of the individual method steps in the control device.
Figure 3B:
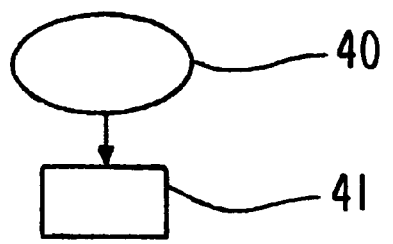
Figure 3C:
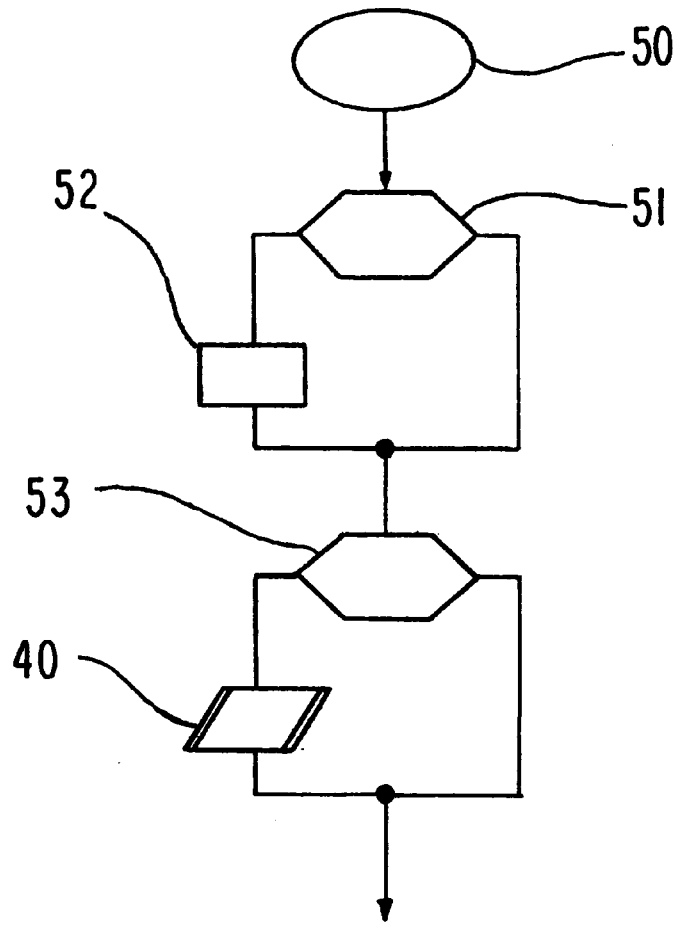

The administering of the wake times in an interconnected assembly is illustrated in accordance with the flow chart of FIGS. 2a, 2b, 2c and 3a, 3b, 3c. The sequence in the time control device is shown in FIGS. 2a, 2b, 2c and the sequence in the control device is shown in FIGS. 3a, 3b, 3c.

The sequence in the time control device is subdivided, as shown in FIG. 2a, into two steps 20 and 30, namely "reception of a new wake time" and "comparison of the wake time". Both steps 20, 30 can be further subdivided as shown in FIGS. 2b and 2c. An output of the step 20 leads to a step 21 for a comparison of a new wake time with a stored wake time, and to a step 23 for storing the new wake time as a stored wake time, if the comparison shows that the stored wake time is greater than the new wake time.

An output of the step 30 leads to a step 31 for a comparison of an actual time with a stored time. If the actual time is greater than or equal to the stored time, it leads to the steps 32 and 33. These steps operate for sending the actual time as a wake time, and setting the stored wake time to a predetermined value.

The transmitted wake time is received in the control device in the step 50 and processed in the step 51, 52, 53 shown in FIGS. 3a, 3b, 3c. In particular, in the step 51 it is compared whether the transmitted actual time (wake time) is greater than or equal to the stored next wake time. When this is so, a desired action is performed in the step 52. If in the step 53 it is determined that a further next wake time is stored, the step 40 is performed which includes transmitting the wake time as a new wake time to the time device.

The cooperation of the control device and the time control device can be illustrated by an example. First, the wake times which are for example inputted manually are stored in the corresponding control device 3 of the memory 11. With an inquiry directed to all control devices 3, after a new wake time, through the time control device the control devices 3 transmit the timely next wake time (step 40) through the CAN bus 5 to the time control device 9. This timely next wake time is then executed (step 41). The comparing and evaluating unit 13 compares the transmitted wake times of the control devices 3 (step 20) and selects the laterally next wake time (step 21 and 22). This data is then stored in the memory 1 of the time control device 9. The other time data remain not considered.

The time control device 9 continuously performs a comparison (step 30) of the actual time with the stored wake time (step 31) and sends the actual time datum (step 32) through the CAN bus to all control devices 3 when the actual time of the stored wake time is reached. Simultaneously the memory 11 of the time control device 9 transmits a value, for example for a next full hour (step 33).

The time datum transmitted by the time control device and corresponding to the actual time is received by each control device (step 50) and compared with the timely next stored wake time (step 51). When this wake time is reached or exceeded, a control device 3 performs the predetermined action, for example turning-on of the stage heating device (step 52) and clears the corresponding time datum to the memory. If further wake times are stored in this control device 3 (step 53), then the timely next wake time is transmitted to the time control device 9 (step 40). This leads to a new wake time inquiry through the time control device 9, so that as described hereinabove, after transmitting of this data again the timely next wake time is selected from the transmitted wake times and can be stored. The transmission of an inquiry can be avoided when each control device transmits the next wake time automatically without inquiry both in the case of coincidence as well as non coincide with the transmitted actual time.

If in the control device meantime the inquired wake process is no longer needed, this information is not transmitted to the time control device. This no longer needed wake time is handled by this control device as if it were inquired by another control device, then no action will take place.

The advantages of the method in accordance with present invention is that the time control device stores and administers a wake time/datum independently from the number of the control devices and the wake times stored there. Thereby the memory consumption is smaller and the software is simpler and more reliable. Moreover the system can be expanded arbitrarily without changes in the time control device software.

It will be understood that each of the elements described above, or two or more together, may also find a useful application in other types of methods and constructions differing from the types described above.

While the invention has been illustrated and described as embodied in method and device for administering wake times, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of administering wake times in an interconnected assembly of several control devices and a time base control device, the method comprising the steps of transmitting by each control device a timely next wake time to the time base control device; comparing the transmitted wake times with one another; storing a timely next wake time by the time bases control device; and upon reaching the stored wake time transmitting by the time base control device an actual time to the control devices.

2. A method as defined in claim 1; and further comprising the steps of comparing by the control devices the transmitted actual time with a stored next wake time; and in the case of their coincidence releasing a desired action.

3. A method as defined in claim 2; and further comprising the steps of transmitting the timely next wake time to the time base control device by the corresponding control device in the case of coincidence with the actual time; and transmitting by other control devices also the timely next wake time.

4. A method as defined in claim 1, wherein said transmitting step includes transmitting the timely next wake time through a CAN-bus.

5. A method as defined in claim 1, wherein said transmitting includes transmitting the timely next wake time which also includes a datum report.

6. A method as defined in claim 1; and further comprising storing in a memory of the time base control device only the timely next wake time.

7. An interconnected assembly as defined in claim 1; and further comprising a CAN-bus for transmitting the wake times.

8. An interconnected assembly for a motor vehicle, comprising a plurality of control devices; a time base control device, each of said control devices and said time base control device having a memory unit for receiving wake times, said memory unit of said time base control device being formed for receiving a wake time data, said time base control device including comparing and evaluating means which compare the wake times transmitted from the control devices so as to select a timely next wake time and to supply it to the memory unit.

9. In the connected an interconnected assembly as defined in claim 8, wherein said time base control device is formed so as to transmit the wake times which include a datum report.

10. In the connected assembly as defined in claim 8, wherein said time base control device has a memory which stores only the timely next wake time.

* * * * *